United States Patent
Lamprecht et al.

[11] Patent Number: 5,888,128
[45] Date of Patent: *Mar. 30, 1999

[54] HAND GRINDER

[75] Inventors: Justus Lamprecht, Dusslingen; Joao Bergner, Aidlingen, both of Germany

[73] Assignee: Robert Bosch GmbH, Stuttgart, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 847,782

[22] Filed: Apr. 28, 1997

[30] Foreign Application Priority Data

May 2, 1996 [DE] Germany ............... 196 17 478.3

[51] Int. Cl.⁶ .................................... B24B 23/04
[52] U.S. Cl. .................. 451/357; 451/441; 451/400; 74/86
[58] Field of Search .................. 451/357, 441, 451/400; 74/86

[56] References Cited

U.S. PATENT DOCUMENTS

| | | | |
|---|---|---|---|
| 4,729,194 | 3/1988 | Maier et al. | 451/357 |
| 5,595,532 | 1/1997 | McCraken | 451/357 |

FOREIGN PATENT DOCUMENTS

| | | | |
|---|---|---|---|
| 0610801 A1 | 2/1994 | European Pat. Off. | |
| 509052 | 5/1957 | Italy | 451/357 |
| 355150964 | 11/1980 | Japan | 451/357 |

*Primary Examiner*—Robert A. Rose
*Assistant Examiner*—George Nguyen
*Attorney, Agent, or Firm*—Michael J. Striker

[57] ABSTRACT

A hand grinder, comprising a housing, a motor arranged in the housing, a tool holder with a grinding tool received in the tool holder, a work shaft driven by the motor, two rotary bearings which support the work shaft, a compensating unit arranged on the work shaft for joint rotation therewith between the rotary bearings and provided for compensation of an imbalance produced by the tool holder with the grinding tool during rotation of the work shaft, the compensating unit including different imbalance masses which are offset from one another in an axial direction of the work shaft and are arranged on the work shaft diametrically opposite to one another.

6 Claims, 1 Drawing Sheet

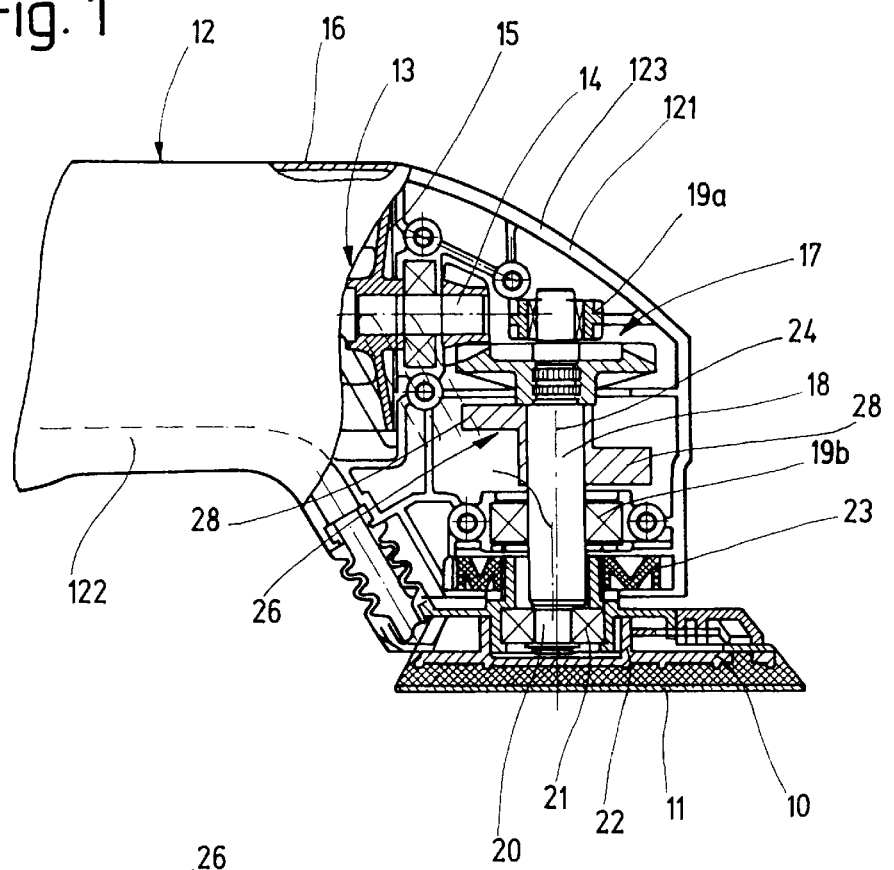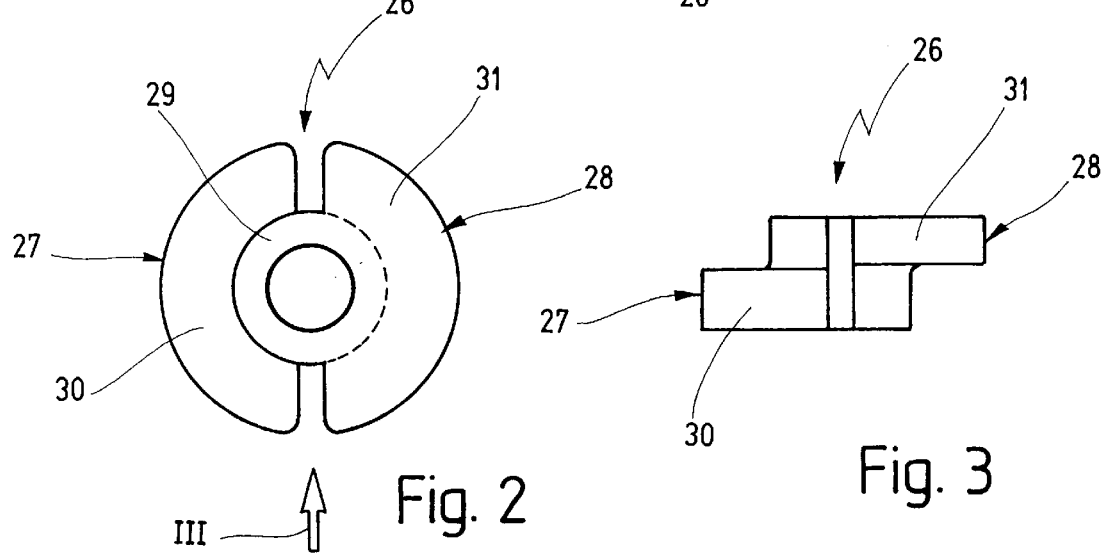

HAND GRINDER

BACKGROUND OF THE INVENTION

The present invention generally relates to hand grinders.

Hand grinders are known and widely utilized. One of such hand grinders, in particular an electrical hand grinder which is formed as a so-called delta grinder is disclosed in the European patent document EP 0 610 801 A1. This hand grinder has an imbalance compensating unit formed as a compensating mass, so that imbalance forces produced by the swinging movement of the tool holder with the grinding tool from the eccentric pin are compensated. Since the compensating unit however does not engage the point of gravity between the rotary bearings of the grinding unit from the tool holder with the grinding tool, but instead from the reasons of construction is arranged at an axial distance from the center of gravity, an additional bending moment is produced which makes the embalance compensation incomplete. As a result, an undesirably increased vibration of the swinging grinder during the operation is caused, which can be clearly detected by an operator.

SUMMARY OF THE INVENTION

Accordingly, it is an object of the present invention to provide a hand grinder, which avoids the disadvantages of the prior art.

In keeping with these objects and with others which will become apparent hereinafter, one feature of the invention resides, briefly stated, in a hand grinder having a housing, a motor arranged in the housing, a tool holder with a grinding tool, a motor-driven drive shaft supported in two housing-fixed rotary bearings, an eccentric pin which is shaped at its one end and received in a further rotary bearing held in the tool holder, a compensation unit for a compensation of an imbalance produced by the tool holder with the grinding tool during rotation of the drive shaft and arranged between two rotary bearings fixedly on the work shaft, wherein in accordance with the new features of present invention, the compensation unit has two imbalance masses which are offset in an axial direction of the work shaft, have different sizes and are arranged diametrically opposite to one another on the work shaft.

When the hand grinder is designed in accordance with the present invention, the compensation unit runs substantially vibration-free. The reason is that the second imbalance mass substantially compensates the moment which is produced by the first imbalance mass for compensation of the imbalance forces of the tool holder and the grinding tool. With the thusly obtained moment equalization, the negative effect of the axial offset of the compensating unit from the center of gravity of the grinding unit composed of the tool holder and the grinding tool on the vibration condition of the hand grinder is eliminated.

A simple design of the compensation unit in accordance with the present invention can be provided when in a preferable embodiment of the invention, the imbalance masses are formed on an upper and a lower end of a hollow cylinder as semi-circular half rings with different axial thicknesses. The both half-rings extend at the side of the hollow cylinder which face away from one another substantially over the half of the periphery of the hollow cylinder.

In accordance with a further advantageous feature of the present invention, the hollow cylinder with the half-rings is formed as a one-piece integral sintered member and pressed on the work shaft. Therefore the compensation unit can be produced in an especially cost-favorable manner.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view of an electrical hand grinder in accordance with the present invention, which is partially sectioned;

FIG. 2 is a plan view of an imbalance-compensating unit of the inventive hand grinder of FIG. 1; and FIG. 3 is a view of the compensation unit of the inventive hand grinder as seen in direction of the arrow III in FIG. 2.

DESCRIPTION OF PREFERRED EMBODIMENTS

A hand-guided electrical hand grinder which is formed as a vibration grinder is shown in section in FIG. 1. In the illustrated embodiment, it is designed as a so called delta grinder which carries a triangular, symmetrical grinding plate as a grinding tool 10. The hand grinder has a grinding plate which is composed of a synthetic plastic material. Its lower side is provided with a bur-like (hooks-loops) coating 11 for receiving a not shown grinding sheets. A hand grinder can be also provided with rectangular grinding plate or with other grinding tools, such as for example a plate grinding projection, a grinding tongue, a grinding pipe. Also, the grinding machine can be formed as an eccentric grinder with a rotatable grinding plate.

The hand grinder has a housing 12 which is assembled of two housing shells 121, 122. They abut against one another along a separating joint 123 which extends parallel to a longitudinal axis of the housing. An electric motor 13 is arranged in the housing 12 and has a driven shaft 14 with a fan 15 on it, as shown in FIG. 1. A switching slider 16 arranged on the upper side of the housing 12 operates for turning on and turning off of the electric motor.

The driven shaft 14 drives a work shaft 18 through an angular transmission 17. The work shaft 18 is rotatably supported in two ball bearings 19a and 19b which are fixed to the housing. The work shaft 18 at the lower end side of the housing 12 extends outwardly of the housing 12 with its eccentric pin 20. A tool holder 22 is arranged on the eccentric pin 20 with a ball bearing 21 which is pressed in the tool holder 22. The tool holder at its lower side receives a plate-shape grinding tool which does not rotate and does not move axially relative to the tool holder. The tool holder 22 and the grinding tool 10 have the shapes which correspond to one another, so that the grinding tool 10 planely abuts against the tool holder 22. The tool holder 22 is composed of a synthetic plastic material and is fixed to the housing 12 through a flexible swinging body 23 so as to be secured from rotation with the rotatable eccentric pin 20.

When the electric motor 13 is turned on by the switching slider 16, it drives the work shaft 18 through the angular transmission 17, and the work shaft rotates about its axis 24. The eccentric pin 20 whose axis 25 is offset by an eccentricity value relative to the axis 24 of the work shaft 18, performs a circulatory movement. Thereby the tool holder 22 which is prevented by the flexible swinging body 22 from rotation, is driven to perform a circulatory swinging movement.

The hand grinder is provided with a compensation unit 26. The compensation unit operates for compensating the imbalance which is produced during the swinging movement of the grinding unit composed of the tool holder 22 and the grinding tool 20 and which can lead to a substantial vibration of the hand grinder in the hand of the operator. The vibration unit makes the hand grinder vibration-free when it is arranged non rotatably on the work shaft 18 in the region between both housing-fixed ball bearings 19*a* and 19*b*.

The compensation unit 26 is composed of two imbalance masses 27 and 28. The imbalance masses 27 and 28 are offset relative to one another in the axial direction of the work shaft 18 and located diametrically opposite to one another on the work shaft 18. The imbalance masses 27 and 28 have different masses. The greater imbalance mass 27 is arranged near the lower housing-fixed ball bearing 19*b* which is closer to the tool holder 22. The imbalance masses 27 and 28 are formed as semi-circular half-rings 30 and 31. They are provided on the upper and lower end of a hollow cylinder 29 and in particular at its sides which face away from one another. The half-rings 30, 31 extend approximately over the half of the periphery of the hollow cylinder.

The hollow cylinder 29 and the half-rings 30 and 31 can be formed as a one-piece integral sintered part which is pressed on the work shaft 18.

It will be understood that each of the elements described above, or two or more together, may also find a useful application in other types of constructions differing from the types described above.

While the invention has been illustrated and described as embodied in hand grinder, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hand grinder, comprising a housing; a motor arranged in said housing; a tool holder with a grinding tool received in said tool holder; a work shaft driven by said motor; two rotary bearings which supported said work shaft; a compensating unit arranged on said work shaft for joint rotation between said rotary bearings so as to engage said tool holder with said grinding tool at a point of gravity between said rotary bearings and provided for compensation of an imbalance produced by said tool holder with said grinding tool during rotation of said work shaft, said compensating unit including a smaller imbalance mass and a greater imbalance mass which are offset from one another in an axial direction of said work shaft and are arranged on said work diametrically opposite to one another, so that a second one of said imbalance masses substantially compensate a moment which is produced by a first one of said imbalance masses for compensation of imbalance forces of said tool holder and said grinding tool, said imbalance masses being arranged at opposite sides of and symmetrically to a longitudinal axis of said work shaft and also transversely to said longitudinal axis.

2. A hand grinder as defined in claim 1, wherein said work shaft has an end provided with an eccentric pin; and further comprising a further rotary bearing which supports said eccentric pin.

3. A hand grinder as defined in claim 1, wherein said greater imbalance mass is arranged closer to one of said rotary bearings which is located closer to said tool holder.

4. A hand grinder as defined in claim 1, wherein said compensating unit includes a hollow cylinder, said imbalance masses being formed as half-circular semi-ring arranged on opposite ends of said hollow cylinder.

5. A hand grinder as defined in claim 4, wherein said half-rings are located at sides of said hollow cylinder which face away from one another and extend over substantially a half of a periphery of said hollow cylinder.

6. A hand grinder as defined in claim 4, wherein said hollow cylinder with said half-rings form a one-piece integral sintered part which is pressed on said work shaft.

\* \* \* \* \*